United States Patent [19]

Gelin

[11] Patent Number: 4,989,447
[45] Date of Patent: Feb. 5, 1991

[54] LIQUID CONFINEMENT LEAK DETECTION SYSTEM

[75] Inventor: Robert J. Gelin, Newark, Ohio
[73] Assignee: Ozite Corporation, Libertyville, Ill.
[21] Appl. No.: 368,584
[22] Filed: Jun. 21, 1989
[51] Int. Cl.⁵ .............................................. G01M 3/32
[52] U.S. Cl. ..................................... 73/49.2; 220/452; 220/445; 220/565
[58] Field of Search ................... 73/49.2; 220/445, 449, 220/444, 1 B

[56] References Cited

U.S. PATENT DOCUMENTS

| | | | |
|---|---|---|---|
| 4,653,312 | 3/1987 | Sharp | 73/49.2 |
| 4,676,093 | 6/1987 | Pugnale et al. | 73/49.2 |
| 4,685,327 | 8/1987 | Sharp | 73/49.2 |
| 4,696,186 | 9/1987 | Sharp | 73/49.2 |
| 4,708,015 | 11/1987 | Sharp | 73/49.2 |
| 4,754,136 | 6/1988 | Blakely | 250/301 |
| 4,798,496 | 1/1989 | Sawada | 405/53 |
| 4,825,687 | 2/1989 | Sharp | 73/49.2 |
| 4,844,287 | 7/1989 | Long | 220/429 |

*Primary Examiner*—John Chapman
*Assistant Examiner*—Joseph W. Roskos
*Attorney, Agent, or Firm*—Wood, Phillips, Mason, Recktenwald & VanSanten

[57] ABSTRACT

A liquid confinement type of leak detection system for a liquid retaining chamber defined by an inner wall of the system. The leak detection system also includes an outer wall in closely spaced adjacent relation to the inner wall to define a normally liquidtight leak detection chamber therebetween, and a porous material disposed between the inner and outer walls so as to be in contact with the inner and outer walls in a manner forming a structural bond therewith. Further, the leak detection system includes sensors associated with the porous material at selected points in the leak detection chamber.

33 Claims, 4 Drawing Sheets

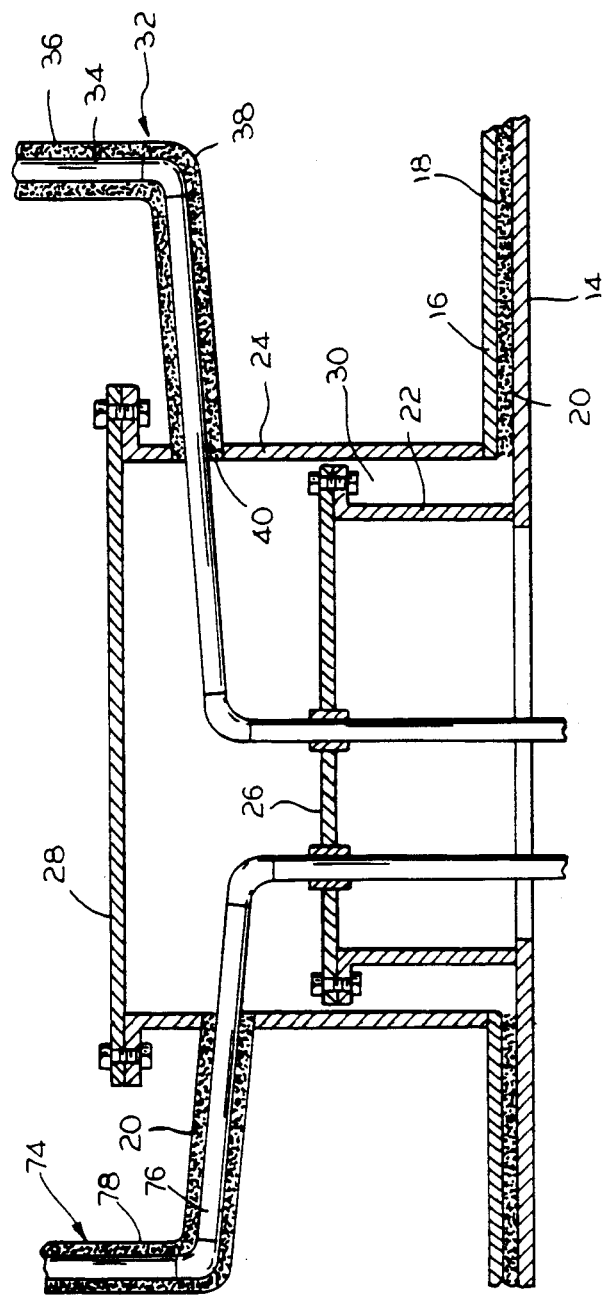
FIG. 3
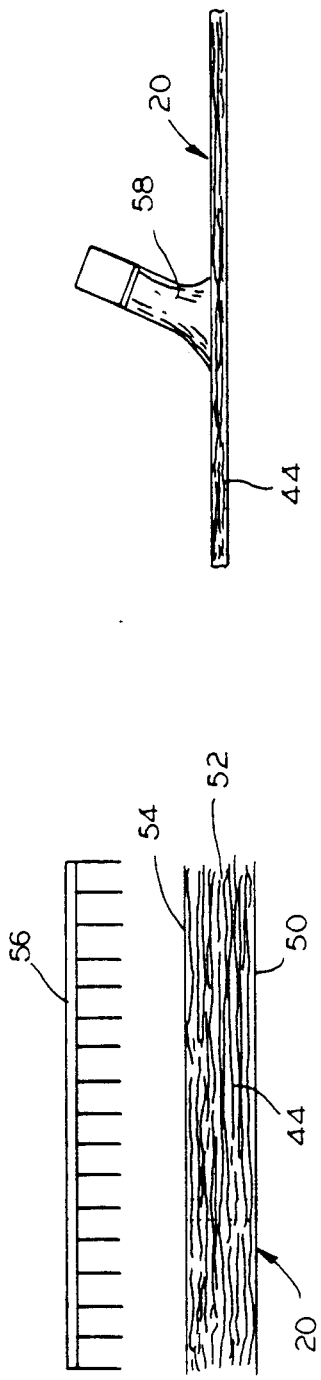
FIG. 5
FIG. 4

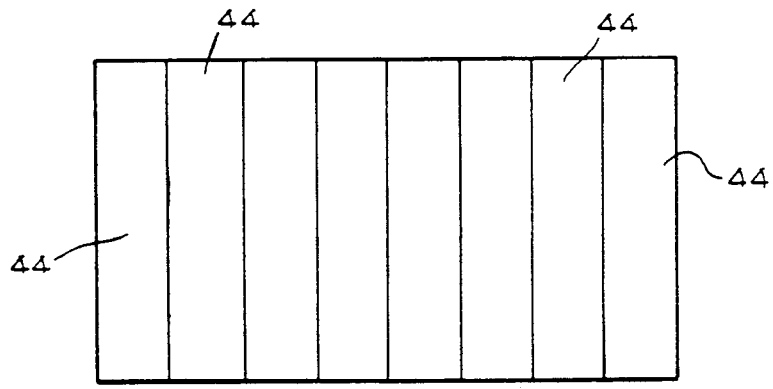
FIG.8C
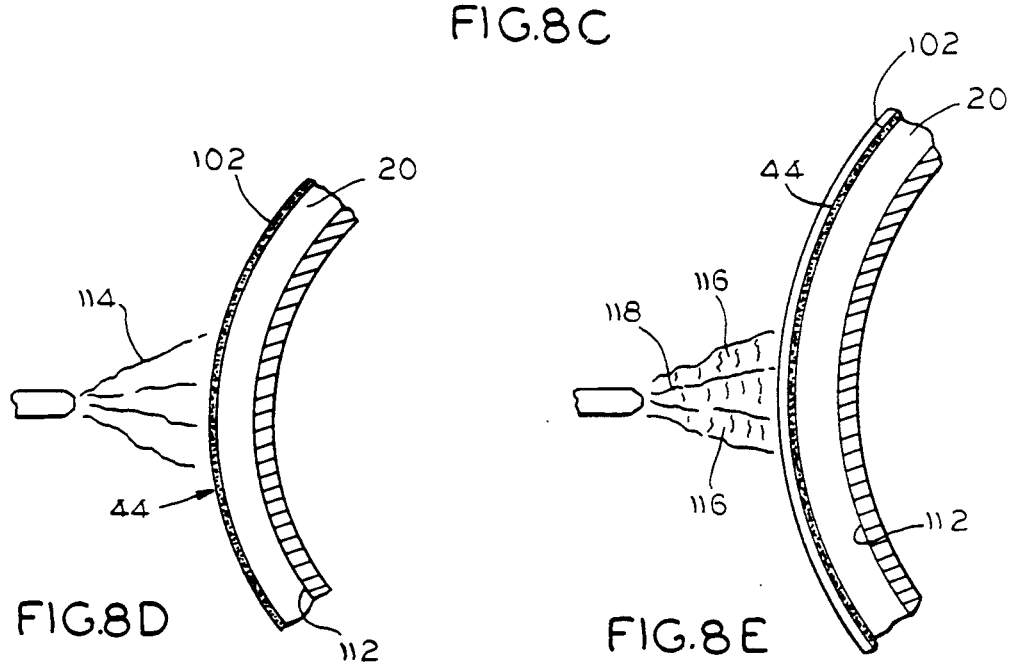
FIG.8D
FIG.8E
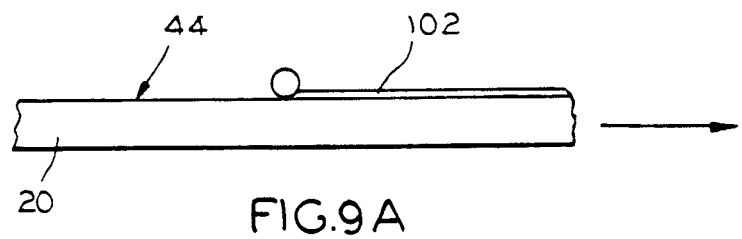
FIG.9A
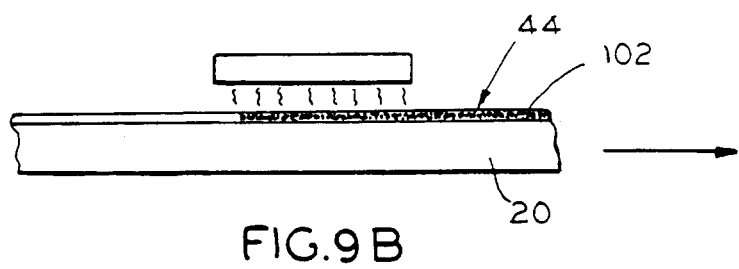
FIG.9B

LIQUID CONFINEMENT LEAK DETECTION SYSTEM

FIELD OF THE INVENTION

The present invention generally relates to leak detection systems and, more particularly, to a leak detection system of the liquid confinement type.

BACKGROUND OF THE INVENTION

Various liquids are conventionally stored in bulk quantities in storage tanks in locations throughout the world. For instance, storage tanks are used extensively for the storage of petroleum products such as gasoline wherein large steel and/or fiberglass vessels are buried in underground locations such as at retail gasoline stations. In most instances, such stations are in populated areas where there is a significant danger associated with leaks from the storage tanks.

Initially, such tanks are well suited for their intended purpose since the highly volatile contents are safely contained. Moreover, they are in a location where they are not readily subject to ignition by any external means which might otherwise cause a fire or explosion. However, after a number of years, such storage tanks often deteriorate by reason of exposure to harsh environmental conditions, particularly for steel tanks.

When such deterioration occurs, the storage tank contents leak from the tank at an unknown underground location. This causes not only loss of the valuable contents, but also possible environmental contamination and health hazards as well as the existence of a potential hazardous condition which typically developed over time inasmuch as any leaks are normally very slow initially. Equally important, ground water then leaks into such underground storage tanks causing a contamination of the liquid stored therein.

To overcome this problem, underground storage tanks have more recently been formed of various plastic materials that are less susceptible to deterioration. These tanks, when typically used for storing gasoline or other liquids, commonly have inner and outer walls spaced apart by a relatively great distance with the walls typically being reinforced by ribs therebetween, but such tanks have been undesirably large, heavy and require much more material for their construction. Moreover, ground water and/or gasoline may leak into the space between the inner and outer walls in the event of a defect in which case the leaking liquid will drain to the lower regions thereof.

With this dual-walled plastic construction, it is generally recognized that significant advances have been made over steel storage tanks in terms of long term avoidance of corrosion. It is nevertheless known that despite the advances to date, there is still a recurring problem of failure of the inner and/or outer walls of such storage tanks which is the reason it has been proposed to place sensors in the lower regions of such tanks capable of providing warnings of any leakage. When leaks do occur in the field, the problem is necessarily serious since gasoline and/or ground water will be contained within the space between the two walls of the tank.

Understandably, it is desirable to have a warning of any leakage in such storage tanks which accounts for the interest in sensors. Furthermore, sensors are now such that the custodian of tank can actually tell whether the liquid leaking into the space between the walls is, for instance, ground water or gasoline. In such manner, it is possible to know not only that there is a leak but also whether the leak is occurring in the inner or outer wall of the storage tank.

Unfortunately, such sensors do nothing toward the major objective of entirely eliminating the possibility of such leaks. Even more significantly, there is no containment of the total storage tank system, i.e., not only the storage tank itself but also access openings and pipeline systems associated therewith. While efforts to this end have been made in U.S. Pat. No. 4,685,327, there is still no entirely satisfactory leak detection system.

In this connection, it is generally known that a significant percentage of leaks occur in access openings and pipeline systems. Thus, whether a leak should occur in or through a manhole, or in any of the pipes normally associated with a storage tank, whether those pipes extend first through a sleeve surrounding a manhole or extend directly into a storage tank, it is important to provide a leak detection system. Moreover, an entirely satisfactory type of liquid confinement leak detection system would find wide-ranging applicability.

The present invention is directed to overcoming one or more of the problems and accomplishing one or more of the objectives as aforementioned.

SUMMARY OF THE INVENTION

Accordingly, the present invention in one broad respect is directed to a liquid confinement leak detection system having an inner wall in closely spaced adjacent relation to an outer wall. The inner wall defines a liquid-retaining chamber whereas the outer wall in conjunction with the inner wall defines a normally liquidtight leak detection chamber having a porous material disposed therebetween so as to be in intimate contact with the inner and outer walls. Further, means are provided for forming a structural bond between the porous material and the inner and outer walls and a leak detection means is associated with the leak detection chamber.

In the preferred embodiment, the porous material disposed between the inner and outer walls is a batt comprised of a needled non-woven fibrous composite material having inner and outer surfaces in intimate contact with the inner and outer walls, respectively The bond forming means preferably includes a fiber-coating binder which substantially coats fibers of the porous material and binds the fibers together and to the inner and outer walls. With this arrangement, the leak detection means advantageously includes sensing means associated with the porous material at selected points for detecting the presence of a leak of at least one preselected type of liquid.

Preferably, the porous material is applied to the inner wall by first applying a liquid resin to the inner wall after which the porous material is applied thereto In a highly advantageous embodiment, the porous material has a barrier layer formed on one surface thereof in which case the porous material is placed on the inner wall with the barrier layer facing outwardly In this case, the outer wall is applied to the porous material by first applying a first coat of a liquid resin to the barrier layer and thereafter applying a second of a liquid resin and chopped fiberglass to the barrier layer.

In one form of the invention, the inner and outer walls are defined by generally concentric inner and outer pipes. These pipes are normally liquid impermeable and are advantageously formed of a rigid material.

As will be appreciated, the liquid retaining chamber in this embodiment will be defined by the inner pipe's inner surface.

In a highly advantageous embodiment of the invention, a storage tank liquid confinement leak detection system is provided. The system then includes a storage tank having an inner wall and an outer wall in closely spaced adjacent relation to define a normally liquidtight space therebetween. It also includes a porous material within the normally liquidtight space in intimate contact with the inner and outer walls of the storage tank together with means for forming a structural bond between the porous material and the inner wall and the outer wall of the storage tank. The system further includes a manhead integral with the inner wall of the storage tank in a manner permitting selective access to the interior of the storage tank. With this arrangement, a sleeve integral with the outer wall of the storage tank encompasses the manhead in a manner defining a normally liquidtight space therebetween.

More specifically, the system is such that the sleeve has a cover forming a liquidtight seal and a pipe having inner and outer walls in closely spaced adjacent relation in a manner defining a normally liquidtight space therebetween. With this arrangement, the pipe extends through the sleeve such that the outer wall of the pipe is integral with the sleeve about an opening therein. As a result, the normally liquidtight spaces of the pipe, sleeve and manhead, and storage tank are all in communication so as to define a single liquid confining leak detection chamber having leak detection means associated therewith.

Preferably, the porous material disposed between the inner and outer walls of the storage tank has fibers which are adapted to wick any liquid which may come into contact with the fibers. For this purpose, the binder cooperates with the fibers of the porous material in such a manner as to leave small passages therebetween having a capillary characteristic.

In a highly preferred embodiment of the invention, the manhead and sleeve are positioned at the top of the storage tank such that any leakage of a liquid into the space between the inner and outer walls of the pipe or into the space between the manhead and sleeve runs by gravity into the porous material between the inner and outer walls of the storage tank.

With this arrangement, the leak detection means preferably includes sensing means in the form of sensors disposed within the space between the inner and outer walls of the storage tank. The sensing means may include at least one type of sensor for detecting the presence of a leak of a preselected type of liquid such as the liquid in the pipe and tank although it may also include another type of sensor for detecting the presence of another liquid normally intended to be maintained outside the pipe and tank. In this connection, the pipe may typically be a liquid dispensing line or a liquid filler line and, in any case, the constituent components are preferably all formed of a rigid material.

In still another embodiment of the invention, the outer wall of the pipe, rather than extending to a sleeve surrounding a manhead, extends directly to the storage tank from the exterior thereof. As in the case where the pipe extended through the sleeve encompassing the manhead, the outer wall of the pipe is integral with the outer wall of the storage tank about an opening therein. Typically, the inner wall of the pipe will extend through the inner wall of the storage tank in liquidtight fashion, e g., where the pipe is a liquid dispensing line or a liquid filler line.

In this embodiment, the normally liquidtight spaces of the pipe and the storage tank together define a single liquid confining leak detection chamber which has leak detection means associated therewith. Moreover, the pipe preferably extends through the top of the storage tank such that any leakage of a liquid into the space between the inner and outer walls of the pipe runs by gravity into the space between the inner and outer walls of the tank.

Other objects, advantages and features of the present invention will become apparent from a consideration of the following specification taken in conjunction with the accompanying drawings.

BRIEF DESCRIPTION OF THE DRAWINGS

FIG. 3 is a side elevational view, partially in section, of a storage tank system wherein the pipes pass through a sleeve and manhead into the interior thereof;

FIG. 4 is a schematic illustration of a first step in forming a batt for use in the leak detection system of the present invention;

FIG. 5 is a schematic illustration of a second step in forming a batt for use in the leak detection system of the present invention;

FIG. 8C is a side elevational view illustrating yet another step in making a storage tank or pipe in accordance with the present invention;

FIG. 8D is a partial cross sectional view illustrating still another step in making a storage tank or pipe in accordance with the present invention;

FIG. 8E is a partial cross sectional view illustrating a final step in making a storage tank or pipe in accordance with the present invention;

FIG. 9A is a schematic illustration of a first step in forming a porous batt for a storage tank or pipe; and FIG. 9B is a schematic illustration of a second step in forming a porous batt for a storage tank or pipe.

DETAILED DESCRIPTION OF THE PREFERRED EMBODIMENTS

Figure 2:
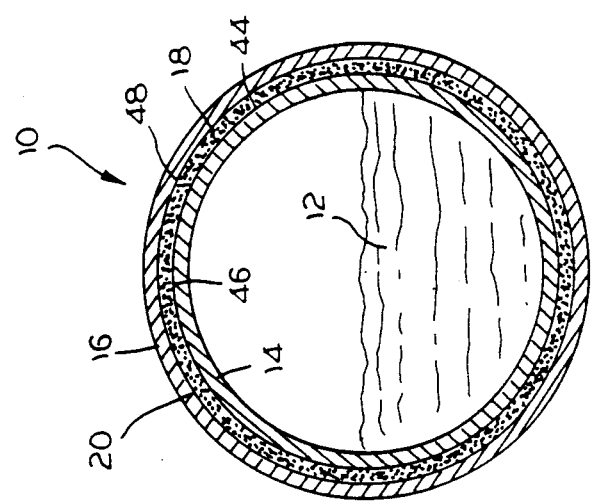
FIG. 2 is a cross sectional view taken along the line 2—2 of FIG. 1.
Figure 1:
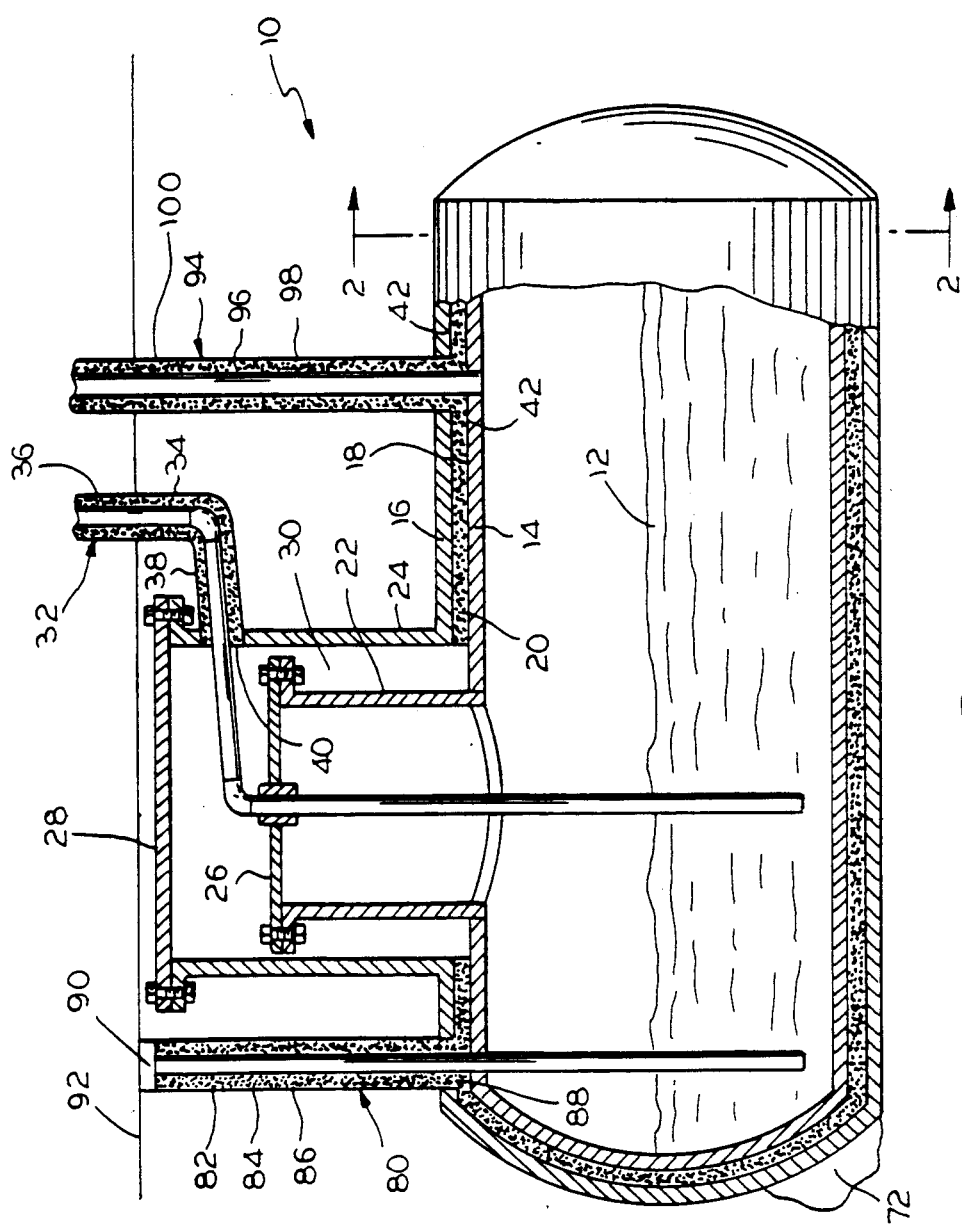
FIG. 1 is a side elevational view, partially in section, of the liquid confinement leak detection system of the present invention.
Figure 6:
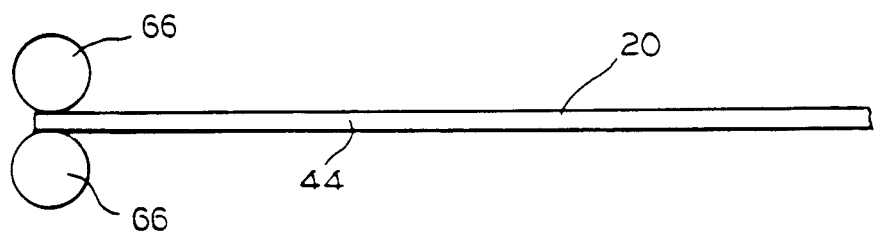
FIG. 6 is a schematic illustration of a third step in forming a batt for use in the leak detection system of the present invention.

Referring to the drawings, and first to FIG. 1, the reference numeral 10 designates generally a storage tank for a liquid 12. It will be understood and appreciated that the invention has been illustrated in conjunction with its use as an underground gasoline storage tank, but it will be understood that the invention has applicability for a wide range of applications such as storage tanks for storing liquids other than gasoline and pipes for conveying any type of liquid. In fact, the present invention provides a liquid confinement leak detection system for any liquid retaining chamber.

As illustrated, the storage tank 10 has an inner wall 14 and an outer wall 16 in closely spaced adjacent relation to define a normally liquidtight space 18 therebetween. A porous material 20 (see also FIG. 4) is provided within the normally liquidtight space 18 in intimate contact with the inner and outer walls 14 and 16 of the storage tank 10 and means are provided for forming a structural bond between the porous material 20 and the inner wall 14 and the outer wall 16 of the storage tank 10 as will be described in greater detail hereinafter. In addition, the storage tank 10 includes a manhead 22 which is integral with the inner wall 14 and a sleeve 24 which is integral with the outer wall 16 as illustrated.

As shown in FIG. 1, the manhead 22 has a removable cover 26 normally forming a liquidtight seal therewith but the removable cover 26 permits selective access to the interior of the storage tank 10. It will also be seen that the sleeve 24 which encompasses the manhead 22 has a removable cover 28 forming a liquidtight seal therewith such that the manhead 22 and the sleeve 24 define a normally liquidtight space 30 therebetween. As will be appreciated, the normally liquidtight space 30 is in communication with the normally liquidtight space 18 between the inner wall 14 and the outer wall 16 of the storage tank 10.

Still referring to FIG. 1, a pipe 32 has an inner wall 34 and an outer wall 36 in closely spaced adjacent relation. The inner wall 34 and outer wall 36 of the pipe 32 define a normally liquidtight space 38 therebetween. As will be appreciated, the outer wall 36 of the pipe 32 is integral with the sleeve 24 about an opening 40 therein.

Further, the normally liquidtight space 38 between the inner wall 34 and outer wall 36 of the pipe 32 is in communication with the normally liquidtight space 30 between the manhead 22 and the sleeve 24. Thus, it will now be seen that all of the normally liquidtight spaces 18, 30 and 38 together define a single liquid confining leak detection chamber. By utilizing leak detection means such as the sensors 42 associated with the leak detection chamber, a highly advantageous storage tank liquid confinement leak detection system has been provided.

Preferably, the porous material 20 is a batt 44 comprised of a needled non-woven fibrous material having inner and outer surfaces 46 and 48 in intimate contact with the inner and outer walls 14 and 16 of the storage tank 10. This will be appreciated from the drawings including FIGS. 2 and 4-7. As shown in FIG. 4, the batt 44 is preferably formed in accordance with the teachings in the application of Conrad D'Elia, U.S. Ser. No. 069,826, filed on July 6, 1987, and entitled "Moldable Fibrous Composite and Methods" now U.S. Pat. No. 4,851,274, issued July 25, 1989.

For purposes of supplementing the disclosure of this application to provide a teaching of suitable fibers for the batt 44 as well as the manner in which the batt 44 may be formed, the entirety of the commonly owned and earlier filed application of Conrad D'Elia, U.S. Ser. No. 069,826, filed on July 6, 1987, and entitled "Moldable Fibrous Composite and Methods", is hereby explicitly incorporated herein by reference.

In this connection, a substrate of non-woven material 50 is covered with a layer of mineral fibers 52 which, in turn, is covered by a top layer of fibers 54 less than approximately seven inches in length, e.g., polyester after which the non-woven fiber composite material is needled by the apparatus schematically represented at 56.

Referring to FIG. 5, the bond forming means preferably includes a fiber-coating binder 58 which is used to saturate the batt 44 to substantially coat fibers of the porous material 20 in a manner binding the fibers together and to the inner and outer walls 14 and 16 of the storage tank 10. This is preferably accomplished by utilizing fibers adapted to wick any liquid coming into contact therewith wherein the binder is such that it leaves small passages having a capillary characteristic therebetween in accordance with commonly owned and earlier filed patent application of the applicant herein, U.S. Ser. No. 219,594, filed on July 15, 1988, and entitled "Storage Tank and Method of Making a Storage Tank, the teachings of which are hereby explicitly incorporated herein by reference. Once the fiber-coating binder 58 has been applied to the batt 44, excess fiber-coating binder 58 is removed from the batt 44 by compressing the batt after saturation to ensure that the fibers are coated and bonded in a manner leaving the small passages having a capillary characteristic to wick any liquid coming into contact with the batt 44 (see FIG. 6).

In accordance with this invention, it should be appreciated that, by "saturation", it is meant that all fibers are coated while leaving the capillary passages after removing the excess binder 58 as by rollers 66. Further, it should be understood that while a specific type of porous material has been described herein the invention contemplates that other types of porous materials will be suitable as well. Accordingly, the only requirement for the porous material 20 is that it has to be a structural material as well as a wicking agent for liquid coming in contact therewith.

Figure 7:
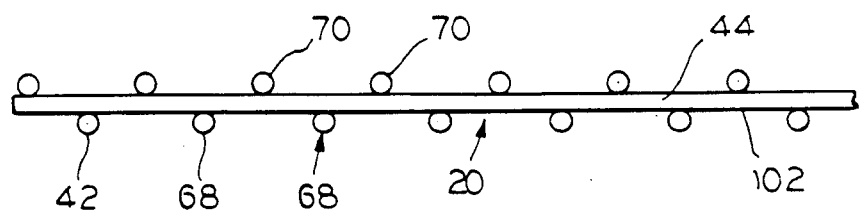
FIG. 7 is a side elevational view of a batt having liquid sensors installed therein for use in the leak detection system of the present invention.

As best shown in FIG. 7, the sensors 42 are preferably disposed at strategic points about the porous material 20 in order to detect the presence of a leak in the storage tank 10. The sensors 42 may be of at least one type, e.g., sensor 68, for detecting the presence of a leak of a preselected type of liquid such as the liquid 12 in the tank 10 and may also be of another type, e.g., the sensor 70, to detect the presence of another liquid 72 normally intended to be maintained the outside tank 10. In the embodiment illustrated in FIG. 1, the liquid 12 will comprise a petroleum product such as gasoline and a liquid 72 will comprise an external substance such as ground water.

As shown in FIGS. 1 and 3, the manhead 22 and the sleeve 24 are positioned at the top of the storage tank 10 for a particular purpose. Thus, any leakage of a liquid into the normally liquidtight space 38 between the inner wall 34 and outer wall 36 of the pipe 32 will run by gravity through the opening 40 in the sleeve 24 into the normally liquidtight space 18 between the inner wall 14 and the outer wall 16 of the tank 10. As a result, the sensors 42 may be provided only in the normally liquidtight space 18 between the inner wall 14 and the outer wall 16 of the storage tank 10.

As shown in FIG. 1, the pipe 32 comprises a liquid, e.g., gasoline, dispensing line. It will be seen in FIG. 3, however, that not only does the liquid dispensing line 32 extend through the sleeve 24, but also a second pipe 74 does as well. By way of example, the pipe 74 may suitably comprise a liquid, i.e., gasoline, filler line.

In accordance with the teaching of commonly owned and earlier filed patent application U.S. Ser. No. 219,594, filed on July 15, 1988, the inner and outer walls 14 and 16 of the storage tank 10, the manhead 22, the sleeve 24, the inner and outer walls 34 and 36 of the pipe 32, and the inner and outer walls 76 and 78 of the pipe 74 may all advantageously be formed of a rigid material.

In an alternative embodiment, or even as a part of the same storage tank 10 illustrated in FIG. 1, a pipe 80 extends from the exterior of the tank into the interior thereof. The pipe 80 has an inner wall 82 and an outer wall 84 in closely spaced adjacent relation to define a normally liquidtight space 86 therebetween. As shown in FIG. 1, the outer wall 84 of the pipe 80 is integral with the outer wall 16 of the storage tank 10.

More specifically, the outer wall 84 of the pipe 80 is integral with the outer wall 16 of the tank 10 about an opening 88 therein. It will be seen that the inner wall 82 of the pipe 80 extends through the inner wall 14 of the tank 10 in sealed liquidtight fashion to the interior thereof whereby the pipe 80 may serve, for instance, as a liquid filler line. For this purpose, the pipe 80 will have a cap 90 typically accessible at ground level 92 where it may temporarily be removed to refill the tank 10 with the liquid 12.

As shown in FIG. 1, the normally liquidtight space 86 of the pipe 80 and the normally liquidtight space 18 of the tank 10 together define what comprises a single liquid confining leak detection chamber. It will be appreciated that the pipe 80 extends through the top of the tank 10 such that any leakage of a liquid into the normally liquidtight space 86 between the inner and outer walls 82 and 84 of the pipe 80 runs by gravity into the normally liquidtight space 18 between the inner and outer walls 14 and 16 of the storage tank 10. With this arrangement, the leak detection means will include sensors 42 which may be of the type 68 for detecting the presence of the liquid 12 or of the type 70 for detecting the presence of another liquid such as the ground water 72.

While the pipe 80 which has been described is illustrated in the drawings as a liquid filler line, this is by way of example only. The exact same construction can also be utilized for a liquid dispensing line such as the pipe 32 or even a vent pipe such as 94 which has an inner wall 96 and an outer wall 98 in closely spaced adjacent relation to define a normally liquidtight space 100 therebetween. In fact, any pipe associated with the storage tank 10 can have this construction if it must pass through either the sleeve 24 or directly through the storage tank 10 (compare FIGS. 1 and 3).

Furthermore, any of the various pipes 32, 74, 80 and 94 can be formed with or without the porous material 20 between the respective inner and outer walls. However, there are distinct advantages to forming the storage tank 10 as well as the various pipes 32, 74, 80 and 94 in accordance with the present invention. For this purpose, the advantages can be understood by making reference to the method illustrated in FIGS. 8A-8E, 9A and 9B.

After the porous material has been needle-punched as illustrated in FIG. 4, a barrier layer 102 is preferably formed prior to applying the batt 44 to a liquid-retaining wall, e.g., inner walls 34, 76, 82, etc. More specifically, the barrier layer 102 is formed by first coating the one surface of the batt 44 with a liquid resin as at 104 which can be done, by way of example, by utilizing a conventional roll coating device 106. Thereafter, it will be seen that a heater 108 is utilized for the purpose of heating the surface of the batt 44 having the liquid resin 104 as shown in FIGS. 9A and 9B.

Once this has been done, the batt 44 is ready to be applied to the inner liquid-retaining wall, e.g., inner walls 14, 34, 76, 82, etc., by any suitable means.

Figure 8A:
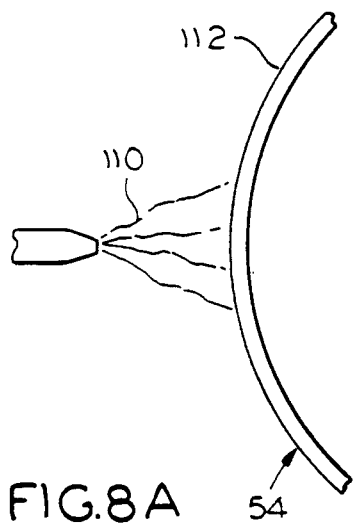
FIG. 8A is a partial cross sectional view illustrating a first step in making a liquid storage tank or pipe in accordance with the present invention.
Figure 8B:
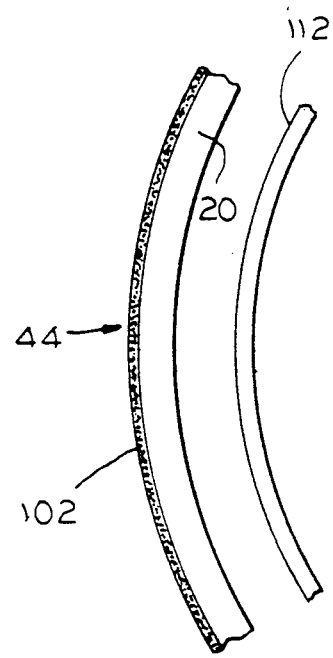
FIG. 8B is a partial cross sectional view illustrating another step in making a liquid storage tank or pipe in accordance with the present invention.

Referring specifically to FIG. 8A, a first coat of the liquid resin as at 110 is applied to the surface 112 of the selected one of the inner liquid-retaining walls. The liquid resin is allowed to set until it becomes tacky after which a second coat of the liquid resin is applied to the surface 112. At this point, the batt 44 can be placed on the surface 112 having the tacky resin thereon as will be appreciated by referring to FIG. 8B.

As will be appreciated, the batt 44 is placed on the surface 112 having the tacky resin thereon with the barrier layer 102 facing away therefrom. It will also be appreciated that the batt 44 will be held in place by the tacky first coat of the liquid resin while the liquid second coat of the liquid resin is penetrating into the porous material 20. When this has been completed, the resulting structure will appear as in FIG. 8C where it is ready to receive the outer wall, e.g., outer walls 36, 78, 84, etc.

Referring now to FIGS. 8D and 8E, the selected one of the outer walls is formed on the batt 44 (see FIG. 8C) by first applying a first coat of the liquid resin as at 114 to the barrier layer 102 (see FIG. 8D). When this first coat has become tacky, the selected one of the outer walls is completed by thereafter applying chopped fiberglass 116 together with a second coat of the liquid resin as at 118 to the barrier layer 102 (see FIG. 8E). After the inner and outer walls have been formed as described herein, the inner wall such as any of inner walls 34, 76, 82, etc., will comprise a liquid-retaining wall.

With the embodiments illustrated herein, the extent of saturation of the porous material by the resin is easily controlled. This is important inasmuch as too much resin could reduce porosity to an undesirable degree whereas too little resin could fail to provide an adequate structural bond. In other words, the barrier layer is advantageous in reducing potential problems with manufacturing process variability.

In practice, the barrier layer will only have limited porosity to restrict the amount of liquid resin penetrating the porous material when forming the outer wall. This is preferably accomplished by utilizing a resin to form the barrier layer whereby some of the resin penetrates the porous material and seals pores therein and some of the resin remains on the surface. Preferably, the barrier layer is formed by roll coating the porous material with the resin and then passing the material through an oven as part of a continuous process (see FIGS. 9A and 9B).

While not previously mentioned, it will be appreciated that the inner and outer walls of the pipes and tank can be formed of any of a number of suitable materials. For instance, they may be formed of fiberglass, steel, aluminum and other metals and synthetics. However, for most applications, the inner and outer walls of the pipes and the tank are all formed of a rigid material.

In a broad sense, the present invention is directed to a liquid confinement leak detection system having an inner wall defining a liquid retaining chamber therewithin. The system includes an outer wall in closely spaced adjacent relation to the inner wall to define a normally liquidtight leak detection chamber therebetween A porous material is disposed between the inner and outer walls so as to be in intimate contact with the inner and outer walls. The system also includes a binder for forming a structural bond between the porous material and the inner and outer walls and leak detection sensors associated with the leak detection chamber. With this arrangement, the liquid confinement leak detection system is suitable for any pipeline, storage tank, or other liquid-retaining chamber application.

While in the foregoing there have been set forth preferred embodiments of the invention, it will be appreciated that the details herein given are merely for purposes of illustration and may be varied by those skilled in the art without departing from the spirit and scope of the invention as defined by the appended claims.

I claim:

1. A liquid confinement leak detection system, comprising:
   an inner wall defining a liquid retaining chamber therewithin, an outer wall in closely spaced adjacent relation to said inner wall to define a normally liquid-tight leak detection chamber therebetween, and a porous material disposed between said inner and outer walls;
   said porous material being a batt disposed between said inner and outer walls and being comprised of a needled non-woven fibrous composite material having inner and outer surfaces in intimate contact with said inner and outer walls;
   means for forming a structural bond between said porous material and said inner and outer walls; and
   leak detection means associated with said leak detection chamber.

2. A liquid confinement leak detection system, comprising:
   an inner wall defining a liquid retaining chamber therewithin, an outer wall in closely spaced adjacent relation to said inner wall to define a normally liquid-tight leak detection chamber therebetween, and a porous material disposed between said inner and outer walls;
   said porous material being in intimate contact with said inner and outer walls;
   means for forming a structural bond between said porous material and said inner and outer walls;
   said bond forming means including a fiber-coating binder, said binder substantially coating fibers of said porous material, said binder also binding fibers of said porous material together and to said inner and outer walls; and
   leak detection means associated with said leak detection chamber.

3. A liquid confinement leak detection system, comprising:
   an inner wall defining a liquid retaining chamber therewithin, an outer wall in closely spaced adjacent relation to said inner wall to define a normally liquid-tight leak detection chamber therebetween, and a porous material disposed between said inner and outer walls;
   said porous material being in intimate contact with said inner and outer walls, said porous material being applied to said inner wall by first applying a liquid resin to said inner wall, said porous material having a barrier layer formed on one surface thereof, said porous material being placed on said inner wall with said barrier layer facing outwardly; and
   leak detection means associated with said leak detection chamber.

4. The liquid confinement leak detection system as defined in claim 3 wherein said outer wall is applied to said porous material by first applying a first coat of liquid resin to said barrier layer, said outer wall being completed by thereafter applying a second coat of a liquid resin and chopped fiberglass to said barrier layer.

5. A liquid confinement leak detection system, comprising:
   an inner wall defining a liquid retaining chamber therewithin, an outer wall in closely spaced adjacent relation to said inner wall to define a normally liquid-tight leak detection chamber therebetween, and a porous material disposed between said inner and outer walls;
   said porous material eing in intimate contact with said inner and outer walls;
   means for forming a structural bond between said porous material and said inner and outer walls; and
   leak detection means associated with said leak detection chamber, said leak detection means including sensing means associated with said porous material at selected points, said sensing means being adapted to detect the presence of a leak, said sensing means including at least one type sensor for detecting the presence of a preselected type of liquid.

6. The liquid confinement leak detection system as defined in claim 5 wherein said sensing means includes at least two different types of sensors, one of said sensor types being adapted to detect the presence of a liquid of the type within said liquid retaining chamber, the other of said sensor types being adapted to detect the presence of a liquid normally found outside said outer wall.

7. A liquid confinement leak detection system, comprising:
   an inner wall defining a liquid retaining chamber therewithin, an outer wall in closely spaced adjacent relation to said inner wall to define a normally liquid-tight leak detection chamber therebetween, and a porous material disposed between said inner and outer walls;
   said inner and outer walls being defined by generally concentric inner and outer pipes, said liquid retaining chamber being defined by an inner surface of said inner pipe, said generally concentric inner and outer pipes normally being liquid impermeable;
   said porous material being in intimate contact with said inner and outer walls;
   means for forming a structural bond between said porous material and said inner and outer walls; and
   leak detection means associated with said leak detection chamber.

8. A storage tank liquid confinement leak detection system, comprising:
   a storage tank having an inner wall and an outer wall in closely spaced adjacent relation to define a normally liquidtight space therebetween;
   a porous material within said normally liquidtight space in intimate contact with said inner and outer walls of said storage tank;
   means for forming a structural bond between said porous material and said inner wall and said outer wall of said storage tank;
   a manhead integral with said inner wall of said storage tank in a manner permitting selective access to the interior of said storage tank;
   a sleeve integral with said outer wall of said storage tank to encompass said manhead, said sleeve having a cover forming a liquidtight seal, said sleeve and said manhead defining a normally liquidtight space therebetween;

said normally liquidtight space between said sleeve and said manhead being in communication with said normally liquidtight space between said inner and outer walls of said storage tank;

a pipe having an inner wall and an outer wall in closely spaced adjacent relation, said inner wall and said outer wall of said pipe defining a normally liquidtight space therebetween, said outer wall being integral with said sleeve about an opening therein;

said normally liquidtight space between said sleeve and said manhead being in communication with said normally liquidtight space between said inner and outer walls of said pipe;

said normally liquidtight space of said pipe, said normally liquidtight space between said sleeve and said manhead, and said normally liquidtight space of said storage tank together defining a single liquid confining leak detection chamber; and leak detection means associated with said leak detection chamber.

9. The storage tank liquid confinement leak detection system as defined in claim 8 wherein said porous material disposed between said inner and outer walls of said storage tank is a batt comprised of a needled non-woven fibrous material having inner and outer surfaces in intimate contact with said inner and outer walls.

10. The storage tank liquid confinement leak detection system as defined in claim 8 wherein said bond forming means includes a fiber-coating binder, said binder substantially coating fibers of said porous material, said binder also binding fibers of said porous material together and to said inner and outer walls of said storage tank.

11. The storage tank liquid confinement leak detection system as defined in claim 8 wherein said porous material has fibers adapted to wick any liquid coming into contact therewith, said binder substantially coating and bonding said fibers of said porous material while leaving small passages having a capillary characteristic therebetween.

12. The storage tank liquid confinement leak detection system as defined in claim 8 wherein said leak detection means includes sensing means associated with said porous material at strategic points, said sensing means including at least one type of sensor for detecting the presence of a leak of a preselected type of liquid.

13. The storage tank liquid confinement leak detection system as defined in claim 12 wherein said sensing means includes at least two different types of sensors, one adapted to detect the presence of said liquid in said tank and the other adapted to detect the presence of another liquid normally intended to be maintained outside said tank.

14. The storage tank liquid confinement leak detection system as defined in claim 8 wherein said manhead and said sleeve are positioned at the top of said storage tank such that any leakage of a liquid into said space between said inner and outer walls of said pipe runs by gravity through said sleeve into said space between said inner and outer walls of said tank.

15. The storage tank liquid confinement leak detection system as defined in claim 14 wherein said leak detection means includes sensing means in said space between said inner and outer walls of said tank, said sensing means including at least one type of sensor for detecting the presence of a leak of a preselected type of liquid.

16. The storage tank liquid confinement leak detection system as defined in claim 15 wherein said sensing means includes at least two different types of sensors, one adapted to detect the presence of said liquid in said pipe and tank and the other adapted to detect the presence of another liquid normally intended to be maintained outside said pipe and tank.

17. The storage tank liquid confinement leak detection system as defined in claim 8 including a porous material disposed between and in intimate contact with said inner and outer walls of said pipe and means for forming a structural bond between said porous material and said inner and outer walls of said pipe.

18. The storage tank liquid confinement leak detection system as defined in claim 8 wherein said pipe is a liquid dispensing line.

19. The storage tank liquid confinement leak detection system as defined in claim 8 wherein said pipe is a liquid filler line.

20. The storage tank liquid confinement leak detection system as defined in claim 8 wherein said inner and outer walls of said storage tank, said manhead, said sleeve, and said inner and outer walls of said pipe are all formed of a rigid material.

21. A storage tank liquid confinement leak detection system, comprising:

a storage tank having an inner wall and an outer wall in closely spaced adjacent relation to define a normally liquidtight space therebetween;

a porous material within said normally liquidtight space in intimate contact with said inner and outer walls of said storage tank;

means for forming a structural bond between said porous material and said inner wall and said outer wall of said storage tank;

a pipe having a inner wall and an outer wall in closely spaced adjacent relation to define a normally liquidtight space therebetween, said outer wall of said pipe extending to said storage tank from the exterior thereof and being integral with said outer wall of said storage tank about an opening therein, said inner wall of said pipe extending through said inner wall of said storage tank in liquidtight fashion to the interior thereof;

said normally liquidtight space of said pipe and said normally liquidtight space of said storage tank together defining a single liquid confining leak detection chamber; and leak detection means associated with said leak detection chamber.

22. The storage tank liquid confinement leak detection system as defined in claim 21 wherein said porous material disposed between said inner and outer walls of said storage tank is a batt comprised of a needled non-woven fibrous material having inner and outer surfaces in intimate contact with said inner and outer walls.

23. The storage tank liquid confinement leak detection system as defined in claim 21 wherein said bond forming means includes a fiber-coating binder, said binder substantially coating fibers of said porous material, said binder also binding fibers of said porous material together and to said inner and outer walls of said storage tank.

24. The storage tank liquid confinement leak detection system as defined in claim 21 wherein said porous material has fibers adapted to wick any liquid coming into contact therewith, said binder substantially coating and bonding said fibers of said porous material while leaving small passages having a capillary characteristic therebetween.

25. The storage tank liquid confinement leak detection system as defined in claim 21 wherein said leak detection means includes sensing means associated with said porous material at strategic points, said sensing means including at least one type of sensor for detecting the presence of a leak of a preselected type of liquid.

26. The storage tank liquid confinement leak detection system as defined in claim 25 wherein said sensing means includes at least two different types of sensors, one adapted to detect the presence of said liquid in said tank and the other adapted to detect the presence of another liquid normally intended to be maintained outside said tank.

27. The storage tank liquid confinement leak detection system as defined in claim 21 wherein said pipe extends through the top of said storage tank such that any leakage of a liquid into said space between said inner and outer walls of said pipe runs by gravity into said space between said inner and outer walls of said tank.

28. The storage tank liquid confinement leak detection system as defined in claim 27 wherein said leak detection means includes sensing means in said space between said inner and outer walls of said tank, said sensing means including at least one type of sensor for detecting the presence of a leak of a preselected type of liquid.

29. The storage tank liquid confinement leak detection system as defined in claim 28 wherein said sensing means includes at least two different types of sensors, one adapted to detect the presence of said liquid in said pipe and tank and the other adapted to detect the presence of another liquid normally intended to be maintained outside said pipe and tank.

30. The storage tank liquid confinement leak detection system as defined in claim 21 including a porous material disposed between and in intimate contact with said inner and outer walls of said pipe and means for forming a structural bond between said porous material and said inner and outer walls of said pipe.

31. The storage tank liquid confinement leak detection system as defined in claim 21 wherein said pipe is a liquid dispensing line.

32. The storage tank liquid confinement leak detection system as defined in claim 21 wherein said pipe is a liquid filler line.

33. The storage tank liquid confinement leak detection system as defined in claim 21 wherein said inner and outer walls of said storage tank and said inner and outer walls of said pipe are all formed of a rigid material.

* * * * *